UNITED STATES PATENT OFFICE.

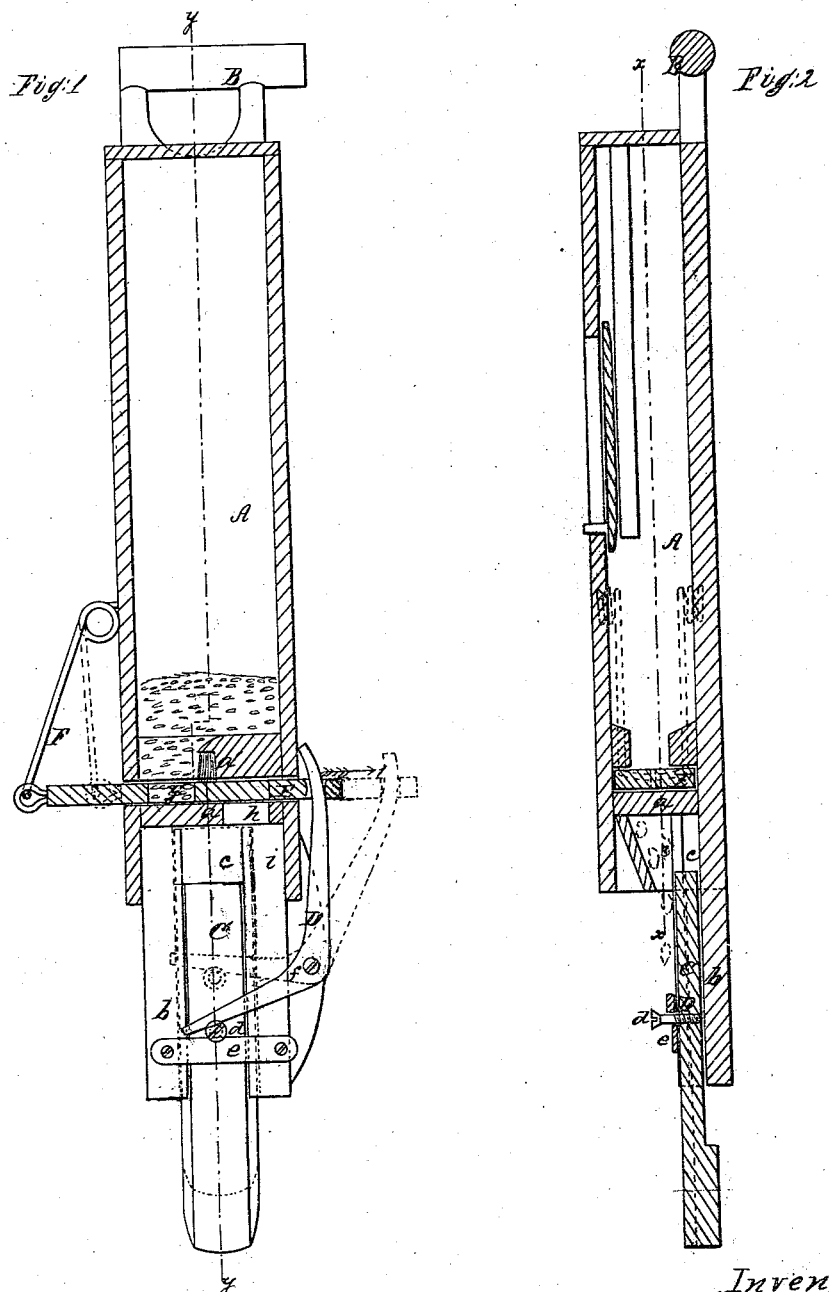

SAMUEL FRETZ, OF BUCKEYE, OHIO.

IMPROVED HAND SEED-DROPPING DEVICE.

Specification forming part of Letters Patent No. 36,646, dated October 14, 1862.

*To all whom it may concern:*

Be it known that I, SAMUEL FRETZ, of Buckeye, in the county of Putnam and State of Ohio, have invented a new and Improved Hand Seed-Dropping Device; and I do hereby declare that the following is a full, clear, and exact description of the same, reference being had to the accompanying drawings, making a part of this specification, in which—

Figure 1 is a vertical section of my invention, taken in the line $x\,x$, Fig. 2; Fig. 2, a vertical section of the same, taken in the line $y\,y$, Fig. 1.

Similar letters of reference indicate corresponding parts in the two figures.

The object of this invention is to obtain a hand seed-dropping device of simple construction which will admit of corn and other seed being dropped very expeditiously and accurately by a very simple manipulation.

The invention consists in combining a slide with a seed-box, lever, spring, and seed-slide in such a manner that by pressing the implement down upon the ground the slide will be forced upward and the seed-slide actuated through the medium of the lever and spring, as hereinafter fully set forth.

To enable those skilled in the art to fully understand and construct my invention, I will proceed to describe it.

A represents a seed-box, which may be of rectangular form and of any proper length. This seed-box is provided with a handle, B, at its upper end, and one side of the box extends down considerably below the bottom $a$ of the box, as shown at $b$. This part $b$ has a groove, $c$, made longitudinally in it to receive a slide, C, the lower end of which may be shod with metal, and it has a screw, $d$, in its outer side, which, when the slide is fully depressed or forced down, strikes against a plate, $e$, attached to $b$, said plate and screw limiting the downward movement of the slide.

D is a bent lever, which is attached to $b$ by a fulcrum-pin, $f$. The upper end of this lever passes through one end of a slide, E, which is fitted transversely in the lower part of the box A, just over its bottom $a$. The opposite end of said slide is connected to a spring, F, attached to one side of the box A, and which has a tendency to keep the upper end of lever D in contact with or quite close to the box A, and the slide C is forced down to its fullest extent, the lower end of the lever D bearing upon the screw $d$, as shown clearly in Fig. 1.

The slide E is a seed-slide, and it has a perforation, $g$, made in it, which, when the slide C is at its lowerst point, is in communication with the seed in box A, a cut-off, $a'$, being above or over the other part of the slide C, which is within box A. (See Fig. 1.) The bottom $a$ of the box A forms a bottom for the perforation $g$, and when the latter is in communication with the interior of the box A the perforation $g$ will become filled with seed from the box A, as shown in Fig. 1.

From the above description it will be seen that when the box A is pressed down, the slide C resting or bearing upon the ground, the slide C being stationary, the box A will be depressed so as to actuate the lever D, and the latter will move the seed-slide E in the direction indicated by arrow 1, and the perforation $g$, which is filled with seed, will be brought over a perforation, $h$, in the bottom $a$ of the box A, and the seed in $g$ will be discharged upon the ground, the seed passing down through a chamber, $i$, below the bottom $a$, as shown clearly in Fig. 2.

When the implement is raised from the ground the spring F will draw the seed-slide E back to its original position, so that the slide C will be forced down and the perforation $g$ brought in communication with the interior of the box A, to become again filled and ready for the succeeding discharging movement.

Thus by this simple arrangement an efficient hand seed-dropping device is obtained, one that may be constructed at a small cost, and which will greatly expedite the hand-planting of corn and other seed in bills. The parts are very readily operated, a slight downward pressure on the box A effecting the result, no special manipulation of any part by the hand or foot being required, as is the case with most other devices of this kind.

Having thus described my invention, what I claim as new, and desire to secure by Letters Patent, is—

The combination of the slide C, lever D, seed-slide E, and spring F, all arranged and applied to the box A, provided with the cut-off $a'$, to operate as and for the purpose herein set forth.

SAMUEL FRETZ.

Witnesses:
CONRAD HENRY,
STEPHEN CROW.